United States Patent
Kobayashi et al.

(10) Patent No.: US 8,309,249 B2
(45) Date of Patent: Nov. 13, 2012

(54) LITHIUM-ION SECONDARY BATTERY

(75) Inventors: Masakazu Kobayashi, Atsugi (JP); Yoshio Shimoida, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1013 days.

(21) Appl. No.: 12/043,388

(22) Filed: Mar. 6, 2008

(65) Prior Publication Data

US 2008/0217078 A1    Sep. 11, 2008

(30) Foreign Application Priority Data

Mar. 8, 2007   (JP) ................. 2007-058287

(51) Int. Cl.
*H01M 2/00* (2006.01)
*B60K 1/00* (2006.01)

(52) U.S. Cl. ........ 429/163; 429/162; 429/176; 429/185; 429/246; 180/65.1

(58) Field of Classification Search .................. 429/162, 429/163, 176, 185, 246; 180/65.1
See application file for complete search history.

(56) References Cited

U.S. PATENT DOCUMENTS

| | | | |
|---|---|---|---|
| 5,824,386 A * | 10/1998 | Laconto et al. | 428/64.1 |
| 6,263,252 B1 * | 7/2001 | St. Ville | 700/98 |
| 6,475,680 B1 * | 11/2002 | Arai et al. | 429/340 |
| 6,727,021 B1 | 4/2004 | Shiota et al. | |
| 6,998,167 B2 | 2/2006 | Nishijima et al. | |
| 2004/0002001 A1 * | 1/2004 | Watanabe | 429/181 |
| 2004/0033416 A1 * | 2/2004 | Kim et al. | 429/175 |
| 2004/0043288 A1 | 3/2004 | Nishijima et al. | |
| 2004/0103537 A1 * | 6/2004 | Kobayashi et al. | 29/893.3 |
| 2004/0146780 A1 | 7/2004 | Rubino et al. | |

FOREIGN PATENT DOCUMENTS

| | | |
|---|---|---|
| CN | 1476643 A | 2/2004 |
| GB | 1 344 565 | 1/1974 |
| JP | 2002-075455 A | 3/2002 |
| JP | 3811353 B2 | 8/2006 |
| KR | 10-2006-0027279 A | 3/2006 |

OTHER PUBLICATIONS

Lange's Handbook of Chemistry (15th Edition), Edited by: Dean, J.A. © 1999 McGraw-Hill.*

* cited by examiner

*Primary Examiner* — Patrick Ryan
*Assistant Examiner* — Alex Usyatinsky
(74) *Attorney, Agent, or Firm* — Foley & Lardner LLP

(57) ABSTRACT

A lithium-ion secondary battery which includes a battery element and an exterior package covering the battery element. The battery element includes a separator, and an electrode-stacked body having a first electrode and a second electrode disposed respectively on both surfaces of the separator in a stacking direction. The exterior package includes a first package member located at one side of the battery element in the stacking direction, and a second package member located at the other side of the battery element in the stacking direction. A linear expansion coefficient α1 of the first package member is greater than a linear expansion coefficient α2 of the second package member.

11 Claims, 17 Drawing Sheets

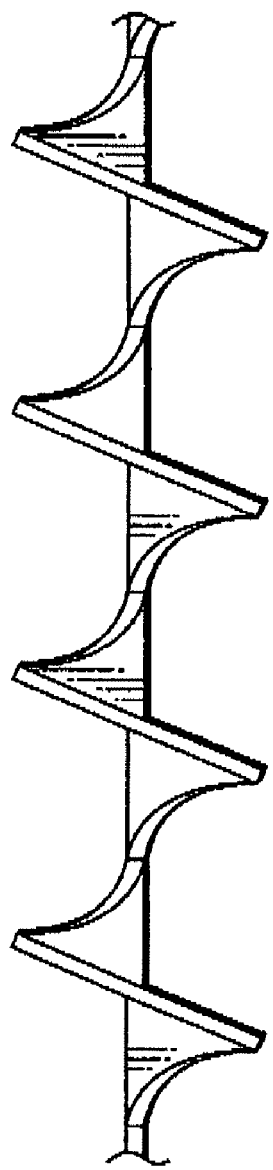
FIG. 13
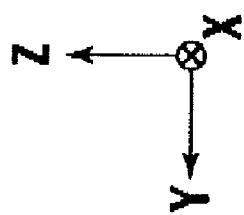

LITHIUM-ION SECONDARY BATTERY

BACKGROUND OF THE INVENTION

1. Field of the Invention

The present invention relates to a lithium-ion secondary battery.

2. Description of the Related Art

In recent years, reduction of carbon dioxide emission has been desired for environmental protection. In the automotive industry, introduction of electric vehicles (EVs) and hybrid electric vehicles (HEVs) has been raising expectations for reduction of carbon dioxide emission. Developments have been made of secondary batteries for powering driving motor that are the key to practical application of these vehicles. In particular, a lithium-ion secondary battery is considered to be suitable for an electric vehicle application due to its high energy density and high durability against repeated charges and discharges. For this reason, developments of various lithium-ion batteries are now in progress.

As disclosed in Japanese Patent Application Laid-open Publication No. 2002-75455, a lithium-ion battery uses a lithium composite oxide and the like as an active material. A conventional active material is prone to deterioration under a high-temperature condition. For this reason, the deterioration of an active material progresses in the case where the temperature of the battery rises with heat generation by the passage of electric current. In response, there is a technique for suppressing such a rise in temperature by reducing a current to be supplied to a battery to some extent under a high temperature. Japanese Patent Publication No. 3811353 uses, as an electron-conductive material in contact with an active material, a material having a characteristic that electric resistance increases with a rise in temperature. Namely, the material used here is an electrically conductive polymer formed by blending an electrically conductive material with a polymer such as polyethylene.

DISCLOSURE OF THE INVENTION

However, this technique has a problem of increasing the internal resistance of the battery even in a normal temperature range because the mixture of the polymer and the electrically conductive material is used as the electron-conductive material which is supposed to have fine electron conductivity. Moreover, in this technique, a current flow is cut off when both an electron-conducting path and an ion-conducting path are shut off due to the fusion of the polymer under a high temperature. This technique, however, has a risk that a battery capacity may not recover to its original level when the temperature returns to the normal range.

An object of the present invention is to provide a lithium-ion secondary battery which is capable of maintaining an output characteristic of the battery in a normal temperature range and also having excellent durability even when preserved under a high temperature.

An aspect of the present invention is a lithium-ion secondary battery comprising: a battery element comprising a separator, and an electrode-stacked body having a first electrode and a second electrode disposed respectively on both surfaces of the separator in a stacking direction; and an exterior package covering the battery element, the exterior package comprising a first package member located at one side of the battery element in the stacking direction, and a second package member located at the other side of the battery element in the stacking direction, wherein a linear expansion coefficient $\alpha 1$ of the first package member is greater than a linear expansion coefficient $\alpha 2$ of the second package member.

BRIEF DESCRIPTION OF THE DRAWINGS

The invention will now be described with reference to the accompanying drawings wherein:

FIG. 13 is a side view showing the concrete example of the shapes of the fins shown in FIG. 12.

DESCRIPTION OF THE PREFERRED EMBODIMENTS

Figure 1:
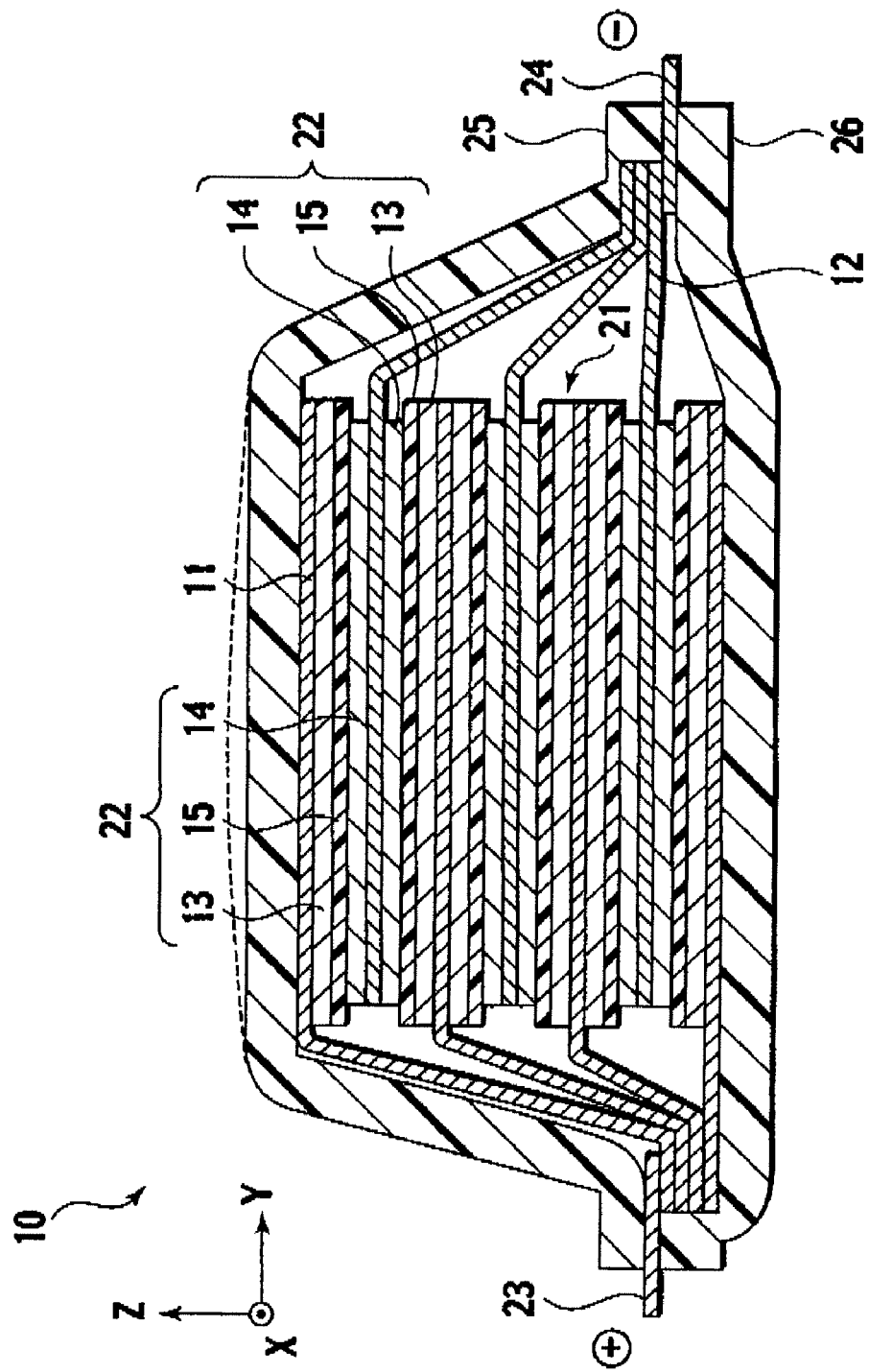
FIG. 1 is a cross-sectional view showing a lithium-ion secondary battery according to a first embodiment of the present invention.

Embodiments of the present invention will be described below with reference to the accompanying drawings. In the following description of the drawings, the same constituents are designated by the same reference numerals, and duplicate explanations will be omitted. Moreover, it is to be noted that dimensional ratios in the drawings may be exaggerated for the purpose of facilitating the description of the invention and may therefore be different from actual dimensional ratios.

As shown in FIG. 1, a lithium-ion secondary battery 10 according to a first embodiment includes a battery element (an electric-power generating element) 21 and an exterior package for sealing the battery element 21 inside the battery. The exterior package includes a first package member 25 and a second package member 26. The battery element 21 includes multiple electrode-stacked bodies 22 stacked one on top of another in a stacking direction (in a Z direction in the drawing or in a thickness direction of each electrode-stacked body 22), and multiple positive electrode current collectors 11 and negative electrode current collectors 12 which are alternately inserted between the respective electrode-stacked bodies 22. Each of the electrode-stacked bodies 22 includes a separator 15, a first electrode (a positive electrode active material layer) 13 and a second electrode (a negative electrode active material layer) 14. The positive electrode active material layer 13 and the negative electrode active material layer 14 are respectively disposed on both surfaces of the separator 15 in the stacking direction. Each of the active material layers includes an active material, binder, and other additives as appropriate. The electrode-stacked bodies 22 that are adjacent to each other in the stacking direction are stacked so that the positive electrode active material layers 13 or the negative electrode active material layers 14 of the respective electrode-stacked bodies 22 face each other. The positive electrode current collector 11 is inserted between the positive electrode active material layers of the electrode-stacked bodies 22 that are adjacent to each other in the stacking direction. Both surfaces of the positive electrode current collector 11 establish surface contact with the respective positive electrode active material layers. Moreover, the positive electrode current collector 11 also establishes surface contact with the outermost positive electrode active material layer of the battery element 21. The negative electrode current collector 12 is inserted between the negative electrode active material layers of the electrode-stacked bodies 22 that are adjacent to each other in the stacking direction. Both surfaces of the negative electrode current collector 12 establish surface contact with the respective negative electrode active material layers. The separator 15 retains an electrolyte. Publicly-known configurations and materials can be used for the current collector, the separator, the active materials, the binder, and the like.

The first package member 25 of the exterior package has a substantially rectangular shape in a plan view in the Z direction. The first package member 25 has an X-direction width (a width in an X direction) Wx1 which is substantially constant across the entire length in a Y direction, and has a Y-direction width (a width in the Y direction) Wy1 which is substantially constant across the entire length in the X direction. Similarly, the second package member 26 of the exterior package has a substantially rectangular shape in a plan view in the Z direction, and has an X-direction width Wx2 (=Wx1) which is substantially constant across the entire length in the Y direction, and has a Y-direction width Wy2 which is substantially constant across the entire length in the X direction. The first package member 25 is joined to the second package member 26 at outer peripheral portions thereof. The junctions are substantially located on a plane which is perpendicular to the Z direction. The rest of the first package member 25 other than the junctions has a convex shape protruding in a positive Z direction. The rest of the second package member 26 other than the junctions has a convex shape protruding in a negative Z direction. The first package member 25 and the second package member 26 jointly apply appropriate pressure (lamination pressure) in the stacking direction to the battery element 21 sealed inside the exterior package. Meanwhile, appropriate contact pressure is generated on each element in the respective electrode-stacked bodies. In this way, the internal resistance of the battery is maintained at a proper level.

Each of the positive electrode current collectors 11 is electrically connected to a positive electrode terminal 23 located on one end in the Y direction. Each of the negative electrode current collectors 12 is electrically connected to a negative electrode terminal 24 located on the other end in the Y direction. The positive electrode terminal 23 and the negative electrode terminal 24 are extended from both of edges in the Y direction of the exterior package to the outside of the battery.

Here, in the lithium-ion secondary battery 10 shown in FIG. 1, the negative electrode active material layers 14 are formed slightly smaller than the positive electrode active material layers 13. However, the present invention is not limited only to this configuration. It is also possible to use the negative electrode active material layers 14 which are of the same size as or slightly larger than the positive electrode active material layers 13.

Now, a characteristic configuration of the lithium-ion secondary battery 10 of this embodiment will be described more in detail.

The first embodiment is characterized in that a linear expansion coefficient $\alpha 1$ of the first package member is greater than a linear expansion coefficient $\alpha 2$ of the second package member. The linear expansion coefficient $\alpha$ is a parameter indicating a ratio of increase in the length of an object associated with rise in a certain unit of temperature of the object. Assuming that the length of the object is L, the temperature is T, and amounts of change are $\Delta L$ and $\Delta T$, respectively, the linear expansion coefficient $\alpha$ is expressed by:

$$\alpha = (\Delta L / \Delta T)/L \qquad \text{(formula 1)}$$

In other words, the greater the value $\alpha$ is, the greater the change ratio of the length corresponding to certain rise in temperature.

The materials usable for the exterior package include resin materials such as carbon fiber reinforced plastics, polyethylene naphthalate (PEN), polyphenylene sulfide (PPS), polyethylene terephthalate (PET), glass fiber reinforced plastics, polyethersulfone, polysulfone, polyetheretherketone, polyamideimide, or polyimide. Moreover, it is also possible to use a laminate material formed by using, as a core material, at least one metallic compound out of: invar alloys; elinvar alloys; kovar alloys; pure titanium or $\alpha$ and $\beta$ titanium alloys; copper alloys such as phosphor bronze, beryllium copper, or cupronickel; stainless steel such as ferritic stainless steel or austenitic stainless steel as represented by SUS316; nickel alloys such as Inconel (registered trademark), Incoloy (registered trademark), or Hastelloy (registered trademark); magnesium alloys such as AZ31 or AZ91; aluminum or aluminum alloys (Al—Cu alloys, Al—Mn alloys, Al—Si alloys, Al—Mg alloys, Al—Mg—Si alloys, Al—Zn—Mg alloys, Al—Zn—Mg—Cu alloys, or aluminum brass; and the like, by coating outside of the battery with electrically insulating layers such as polyethylene, polypropylene, modified polyolefin, ionomer, amorphous polyolefin, polyethylene terephthalate, polyamide, and by coating inside of the battery with electrically insulating layers such as polyethylene, polypropylene, modified polyolefin, ionomer, ethylene-acetate vinyl copolymer. Here, these electrically insulating layers are preferably coated thinly so as not to affect the linear expansion coefficient of the metallic material. In this case, the linear expansion coefficients of the outer layer materials are set equal to the linear expansion coefficient of the metallic material.

The materials usable to the first package member and the second package member, and the linear expansion coefficients thereof are listed in Table 1.

TABLE 1

| Material group | Linear expansion coefficient [×10$^{-6}$/° C.] | Material examples |
|---|---|---|
| A | below 0 | Carbon fiber reinforced plastics, Invar alloys, Elinvar alloys |
| B | 0 to 10 | Titanium alloys, Kovar |
| C1 | 10 to 17 | PEN |
| C2 | | Copper alloys (Phosphor bronze, Beryllium copper, Cupronickel) |
| C3 | | C3 carbon steel, Alloy steel (steel alloys), Stainless steel (austenite, ferrite). Nickel alloys (Incoloy, Hastelloy, Inconel) |
| D1 | 17 to 25 | PPS, PET |
| D2 | | Glass fiber reinforced plastics, Magnesium alloys (AZ31, AZ91) |
| D3 | | Aluminum alloys (#1000 to #7000, Aluminum brass) |
| E | 25 and above | Polyethersulfone, Polysulfone, Polyetheretherketone, Polyamideimide, Polyimide |

The relation between the values α1 and α2 is not particularly limited as long as α1>α2 is satisfied. However, in order to exert an effect of the present invention more significantly, a difference of the linear expansion coefficient between the values α1 and α2 is set preferably in a range from 5 to 50 [×10$^{-6}$/° C.], or more preferably, in a range from 10 to 20 [×10$^{-6}$/° C.].

Using the reference codes for the material groups in Table 1, preferable combinations that satisfy the above-mentioned relation may be: B and A; C1 and A and/or B; C2 and A and/or B; D1 and at least one selected from the group consisting of A, B, C2, and C3; D2 and at least one selected from the group consisting of A, B, C2, and C3; D3 and at least one selected from the group consisting of A, B, C2, and C3; and E and at least one selected from the group consisting of A, B, C2, C3, D1, D2, and D3, all of which are enumerated in the order of the first package member and the second package member. Among them, particularly preferable combinations are: C1 and A; C2 and A; D1 and B; D2 and B; D3 and B; and E and C2 and/or C3, all of which are enumerated in the order of the first package member and the second package member.

In the present invention, the linear expansion coefficient is calculated in accordance with the thermomechanical analysis (TMA) method as defined in JIS K 7197 in a temperature range from 20° C. to 120° C. in the case of a resin material. Meanwhile, when the core of the laminate film member is made of a metallic material, the linear expansion coefficient of the metallic material is also calculated in accordance with the TMA method as defined in JIS K 7197. Measurement of the linear expansion coefficient is carried out by use of a thermomechanical analyzer (TMA-60/60H, made by Shimadzu Corporation).

Both of the first package member and the second package member start to expand when the battery is placed in a high-temperature environment. Here, since the linear expansion coefficient α1 of the first package member is greater than the linear expansion coefficient α2 of the second package member, internal stress is generated in the exterior package. Then, compressive stress acts on the first package member while tensile stress acts on the second package member. Accordingly, the first package member is deformed into a convex shape toward the outside of the battery (in the positive Z direction) as indicated with a dash line in FIG. 1. Then, as a volume inside the battery (a volumetric capacity of the external package) is increased, lamination pressure to the battery element (surface pressure on the electrode-stacked body) is decreased. This decrease of lamination pressure increases the internal resistance of the battery, or breaks off a conductive path. Consequently, a current flow is cut off, so that further rise in temperature is suppressed. This configuration prevents the active materials from deteriorating due to a rise in temperature, and hence, a battery in this configuration has excellent durability. Meanwhile, when the temperature of the battery returns to normal, the exterior package returns from the condition of the convex deformation toward the outside of the battery, and regains the normal contour. Accordingly, an output characteristic of the battery in a normal temperature range is maintained.

In other words, the lithium-ion secondary battery having the above-described configuration has excellent durability in an environment with high temperature fluctuation, and is therefore suitable for application to a vehicle such as an automobile.

In the first embodiment, assuming that average thickness of the first package member is d1 and the Young's modulus thereof is s1, and that average thickness of the second package member is d2 and the Young's modulus thereof is s2, it is preferable that these parameters satisfy a relation expressed by d1×s1<d2×s2. If this relation is satisfied, when the first package member begins to expand, the second package member reacts to block expansion of the first package member. Accordingly, the effect of the present invention of deformation of the first package member into the convex shape toward the outside of the battery is more significantly exerted. Here, the average thickness means an average value of plate thickness of each of the package members in a cross section parallel to the Z axis such as a cross section perpendicular to the X direction or to the Y direction.

In the present invention, the Young's modulus is calculated by measurement at 298 [K] by use of a test metal piece containing the same composition as the used material and having dimensions of 40 [mm]×50 [mm]×1 [mm] in accordance with the transverse resonance method as defined in JIS Z 2280.

Although the Young's modulus of each of the package members is not particularly limited, the modulus is usually set in a range from 20 to 25 [GPa]. Meanwhile, the average thickness of each of the package members is usually set in a range from 100 to 200 [μm].

Incidentally, although the upper package member is defined as the first package member in FIG. 1, the lower package member may also be defined as the first package member. That is, the first embodiment encompasses all configurations of the batteries as long as the respective package members have mutually different linear expansion coefficients.

Figure 2:
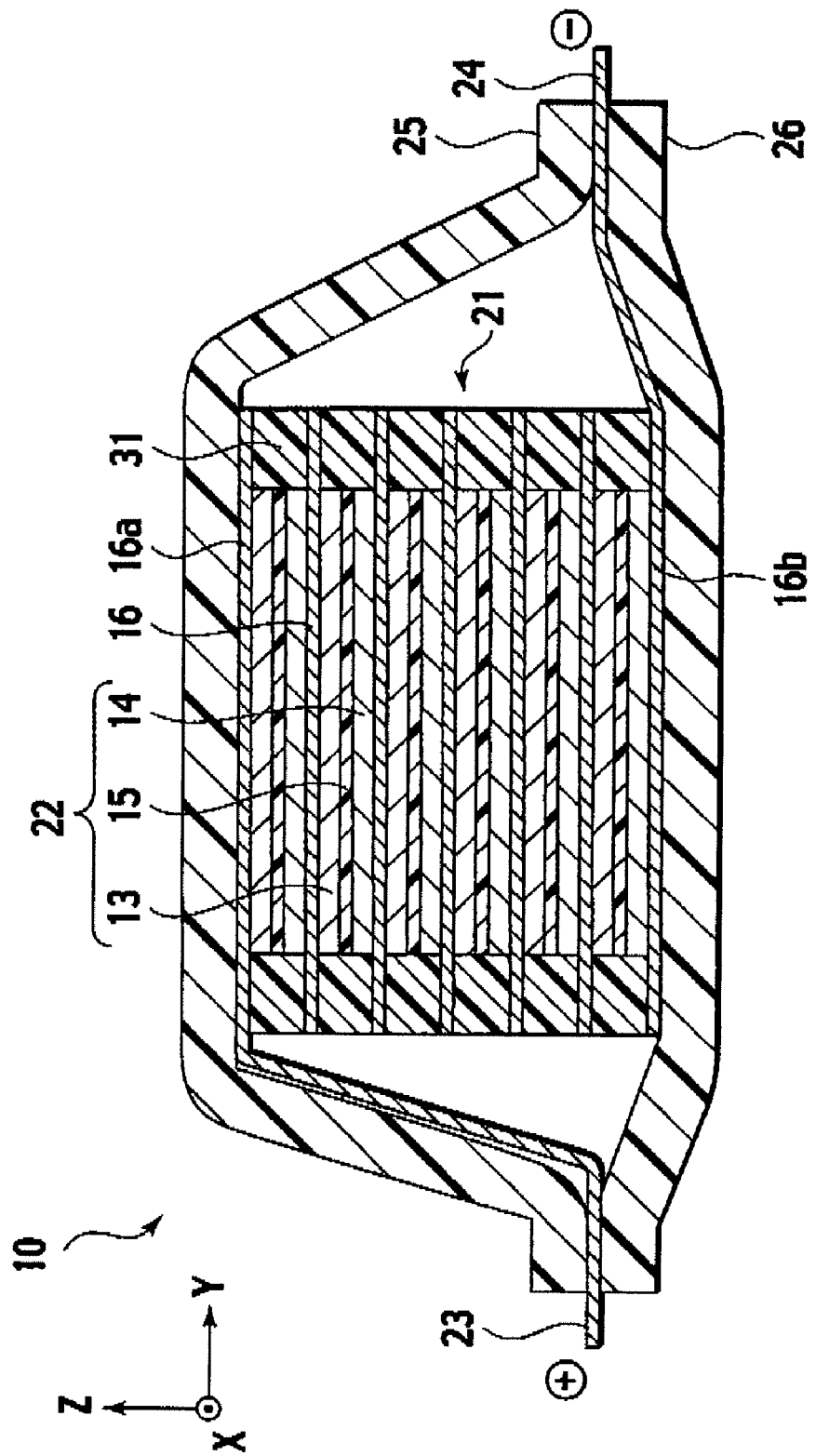
FIG. 2 is a cross-sectional view showing a bipolar lithium-ion secondary battery according to the first embodiment.

Meanwhile, in a modified example of the first embodiment, the lithium-ion secondary battery may be formed as a so-called bipolar battery in which the respective electrode-stacked bodies are connected in series. An example of such a bipolar battery is illustrated in FIG. 2. In the case of the lithium-ion secondary battery 10 of the first embodiment shown in FIG. 2, the battery element 21 configured to perform charge and discharge reactions includes the multiple electrode-stacked bodies 22 and multiple current collectors 16. The electrode-stacked bodies 22 are stacked on one another in the stacking direction, and the current collectors 16 are respectively inserted between the electrode-stacked bodies 22. Each of the electrode-stacked bodies 22 includes the separator 15, the first electrode (the positive electrode active material layer 13) and the second electrode (the negative electrode active material layer 14) which are respectively disposed on both surfaces of the separator 15 in the stacking direction. The respective electrode-stacked bodies 22 are stacked so that the positive electrode active material layer 13 or the negative electrode active material layer 14 of each of the electrode-stacked bodies 22 faces the negative electrode active material layer 14 or the positive electrode active material layer 13 of the electrode-stacked body 22 which is adjacent thereto in the stacking direction. The current collector 16 is inserted between the positive electrode active material layer and the negative electrode active material layer of the electrode-stacked bodies 22 that are adjacent to each other in the stacking direction. Both surfaces of the current collector 16 establish surface contact with the respective active material layers. A current collector 16*a* is disposed so as to establish surface contact with the positive electrode active material layer 13 located on the uppermost layer of the battery element 21. A current collector 16*b* is disposed so as to establish surface contact with the negative electrode active material layer 14 located on the lowermost layer of the battery element 21. Insulating seal members 31 are provided in spaces between the respective current collectors 16, 16*a*, and 16*b* around the electrode-stacked bodies 22. The separator 15 retains an electrolyte.

The positive electrode outermost layer current collector 16*a* is electrically connected to the positive electrode terminal 23 located on one end in the Y direction. The negative electrode outermost layer current collector 16*b* is electrically connected to the negative electrode terminal 24 located on the other end in the Y direction. The positive electrode terminal 23 and the negative electrode terminal 24 are extended from both of edges in the Y direction of the exterior package to the outside of the battery.

Figure 3:
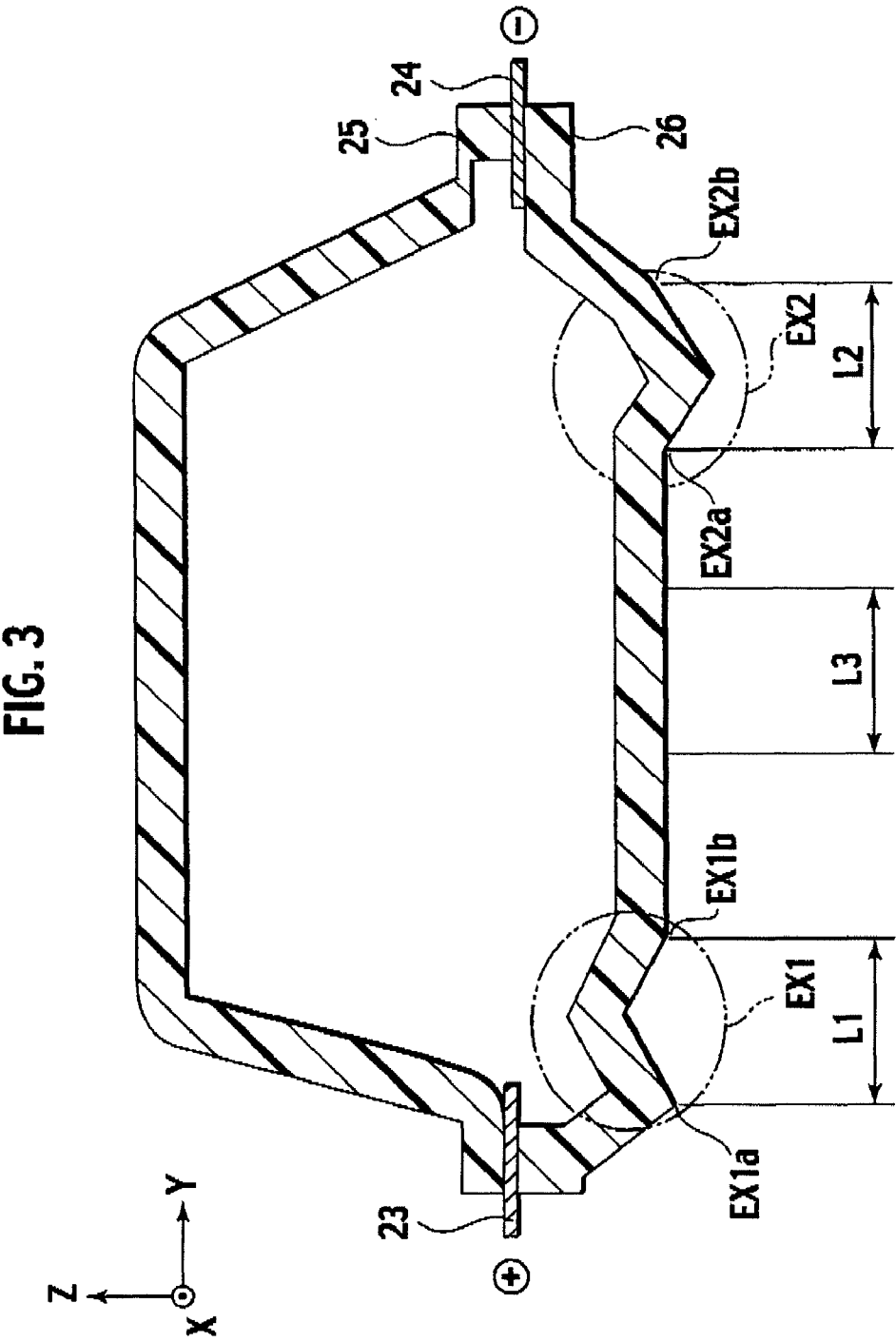
FIG. 3 is a cross-sectional view showing a lithium-ion secondary battery according to a modified example of the first embodiment.

FIG. 3 is a cross-sectional view showing an outline of a lithium-ion secondary battery according to another modified example of the first embodiment. The battery element in this example is the same as that illustrated in FIG. 1, and the description thereof will be omitted herein.

In the lithium-ion secondary battery shown in FIG. 3, extra margins EX1 and EX2 are formed on part of the second package member 26 of the first embodiment. The "extra margin" stated herein means a region of the package member, which is bent in an inward direction or an outward direction. The extra margin is more deformable upon application of a tensile force or a compressive force in a direction perpendicular to the Z axis, namely, such as the X direction or the Y direction, than the other region of the package member. To be more precise, assume a case where the temperature of the battery rise and the compressive force acts on the first package member 25 and the tensile force acts on the second package member 26 due to the difference in the linear expansion coefficients between the two package members, distances L1 and L2 between end points (EX1*a* and EX1*b* or EX2*a* and EX2*b*) of the respective extra margins EX1 and EX2 in the second package member 26 grow more than a distance between two points in the other region (for example, an distance L3) and the deformation of the extra margins EX1 and EX2 start prior to deformation of the first package member 25 into the convex shape toward the outside of the battery. Specifically, the extra margin is extended by application of the tensile force having a smaller absolute value than an absolute value of the compressive force necessary to deform the first package member 25 into the convex shape.

It is preferable to provide the extra margins so as to minimize a change in the volumetric capacity inside the battery on the whole as a result of expansion of the package member at the time of the rise in temperature. To be more precise, it is preferable to provide each battery with a combination of the region EX1 bent inward and the region EX2 bent outward as shown in FIG. 3.

When the second package member is provided with the extra margins, it is preferable to use a material having elasticity for the package member. Such a material may be a laminate material formed by using, as a core material, a metallic compound out of: invar alloys; elinvar alloys; kovar alloys; pure titanium, or α and β titanium alloys; copper alloys such as phosphor bronze, beryllium copper or cupronickel; stainless steel such as ferritic stainless steel or austenitic stainless steel as represented by SUS316; nickel alloys such as Inconel (registered trademark), Incoloy (registered trademark) or Hastelloy (registered trademark); and magnesium alloys such as AZ31 or AZ91, and by coating electrically insulating layers outside.

In the battery including the second package member provided with the extra margins as described above, the second package member expands with the extra margins thereof extending before the first package member starts to deform into the convex shape, up to a predetermined temperature in the case of the rise in temperature of the battery. During this period, the first package member is not deformed into the convex shape but just expands freely. Accordingly, neither the volume inside the battery (the volumetric capacity of the exterior package) nor the lamination pressure to the battery element (the surface pressure on the electrode-stacked bodies) changes. Consequently, the battery characteristic in a normal operation range is maintained. With the extra margins being fully extended, the second package member then acts to block the free expansion of the first package member. Accordingly, the first package member is deformed into the convex shape.

The extra margins can be easily obtained by forming the bent regions by means of cold press. However, the method of obtaining the extra margins is not limited only to the foregoing.

Figure 4:
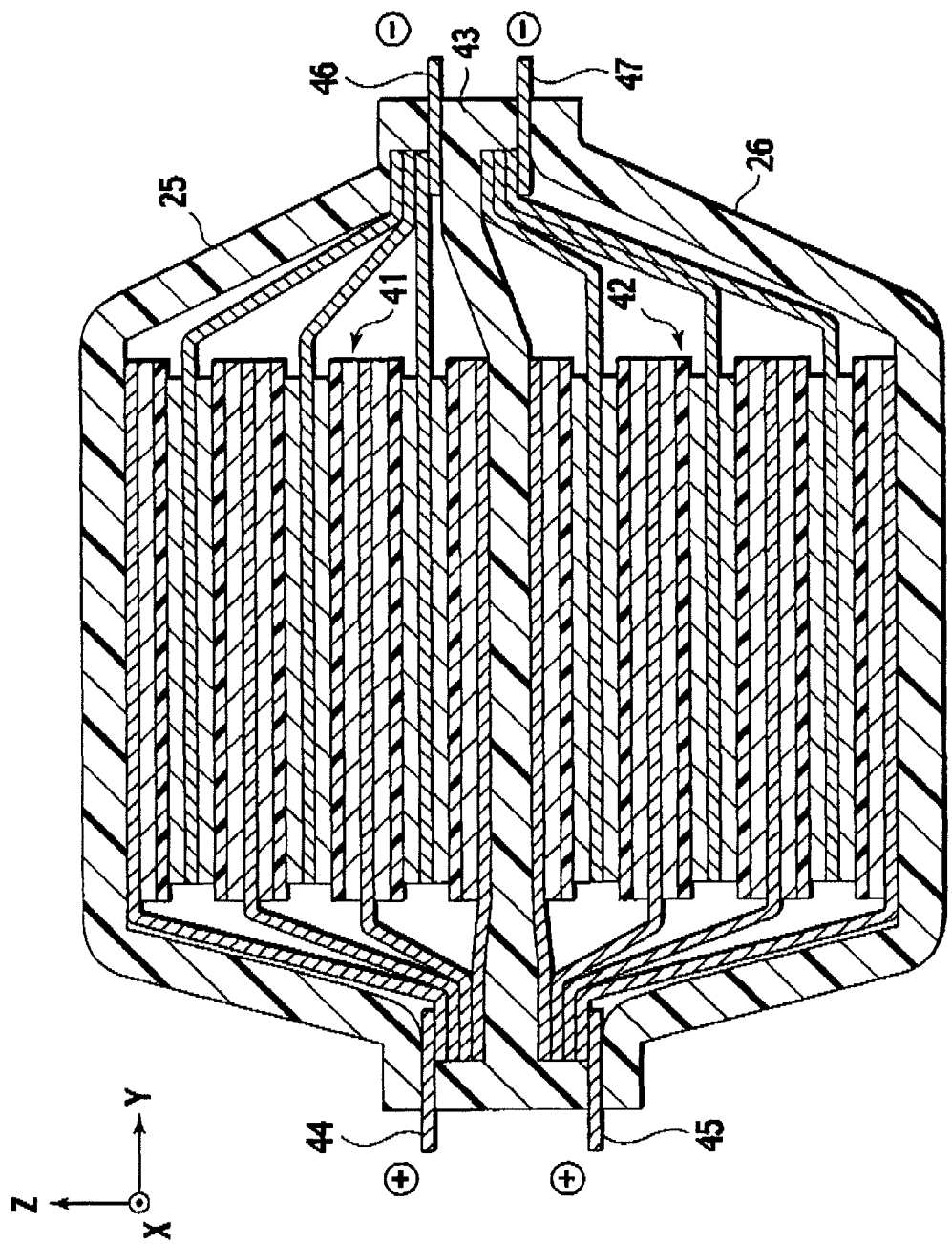
FIG. 4 is a cross-sectional view showing a lithium-ion secondary battery according to a second embodiment.

FIG. 4 is a cross-sectional view showing an outline of a lithium-ion secondary battery according to a second embodiment. Now, this embodiment will be described with reference to FIG. 4. The lithium-ion secondary battery of this embodiment includes a first battery element 41 and a second battery element 42 and a third member 43. The first battery element 41 and the second battery element 42 collectively serve as a battery element configured to perform charge and discharge reactions. The third member is sandwiched between the first battery element 41 and the second battery element 42. Meanwhile, the lithium ion secondary battery includes the first package member 25 and the second package member 26. The first package member 25 is located at an opposite side from the side where the first battery element 41 is in contact with or abuts on the third member 43, to cover the first battery element. The second package member 26 is located at an opposite side from the side where the second battery element 42 is in contact with or abuts on the third member 43, to cover the second battery element. The third member 43 is joined at an outer peripheral portion thereof to both of the first package member 25 and the second package member 26.

Meanwhile, a first positive electrode terminal 44 is electrically connected to a second positive electrode terminal 45, and a first negative electrode terminal 46 is also electrically connected to a second negative electrode terminal 47. In FIG. 4, the terminals of the same polarity are extracted in the same direction and are connected to each other. Instead, it is also possible to remain these terminals unconnected and to clamp the terminals together when forming an assembled battery. Alternatively, it is also possible to extract the terminals having the mutually opposite polarities in the same direction from the first and second battery elements (such as extracting the first positive electrode terminal 44 and the second negative electrode terminal 47 from one end in the Y direction and extracting the second positive electrode terminal 45 and the first negative electrode terminal 46 from the other end in the Y direction). In this case, it is possible to obtain the battery having the doubled voltage by connecting the terminals on one of the ends.

The first battery element and the second battery element may be identical to the battery elements of the first embodiment shown in FIG. 1 and FIG. 2. Meanwhile, the first battery element and the second battery element may have the same configuration or mutually different configurations.

The material for forming the third member is not particularly limited as long as the outermost section thereof has an electrical insulation property. The same material can be used for the first package member and the second package member.

In this embodiment, the linear expansion coefficient $\alpha 1$ of the first package member, the linear expansion coefficient $\alpha 2$ of the second package member, and a linear expansion coefficient $\alpha 3$ of the third member satisfy a relation of $\alpha 1 \geq \alpha 3 > \alpha 2$.

All of the first package member, the second package member, and the third member start to expand upon the rise in temperature of the battery. Here, the linear expansion coefficients $\alpha 1$ and $\alpha 3$ of the first package member and the third member, respectively, are greater than the linear expansion coefficient $\alpha 2$ of the second package member. Accordingly, the internal stress is generated in the exterior package, and the compressive stress acts on the first package member while the tensile stress acts on the second package member.

Meanwhile, in the second embodiment, assuming that the average thicknesses of the first package member and the third member are d1 and d3 and the Young's moduli thereof are s1 and s3, respectively, and that the average thickness of the second package member is d2 and the Young's modulus thereof is s2, it is preferable that these parameters satisfy a relation expressed by $(d1 \times s1 + d3 \times s3) < d2 \times s2$. If this relation is satisfied, when the first package member and the third member begin to expand, the second package member reacts to block expansion of the first package member and the third member. Accordingly, the first package member is deformed into a convex shape toward the outside of the battery (in the positive Z direction) whereas the third member is deformed into a convex shape toward the first package member (in the positive Z direction).

When the linear expansion coefficients of the first package member and the third member satisfy a relation of $\alpha 1 > \alpha 3 > \alpha 2$, an amount of deformation of the first package member is greater than that of the third member, and the amount of deformation of the third member is greater than that of the second package member. Accordingly, both of a volumetric capacity of a space between the first package member and the third member where the first battery element is disposed, and a volumetric capacity of a space between the third member and the second package member where the second battery element is disposed are increased. Due to the increase in the volume (the volumetric capacity) of the exterior package, the lamination pressure on both of the first and second battery elements (the surface pressure on the electrode-stacked bodies) is decreased. This decrease of lamination pressure increases the internal resistance of the battery, or breaks off a conductive path. Consequently, a current flow is cut off, so that further rise in temperature is suppressed. This configuration prevents the active materials from deteriorating due to a rise in temperature, and hence, a battery in this configuration has excellent durability. Meanwhile, when the temperature of the battery returns to normal, the exterior package returns from the condition of the convex deformation toward the outside of the battery, and regains the normal contour. Accordingly, the output characteristic of the battery in a normal temperature range is maintained.

Meanwhile, disposition of the third member improves physical strength of the battery as compared to the battery that only uses the package members. Moreover, reduction in a cooling performance may also be suppressed by using the laminate material that includes metal as the core material as the third member. Furthermore, in the case of a bipolar secondary battery, two batteries are integrated by use of the third member. Four package members are usually needed to connect two batteries in series whereas this embodiment only requires three members. Accordingly, downsizing and cost reduction of the batteries can be achieved.

Figure 5:
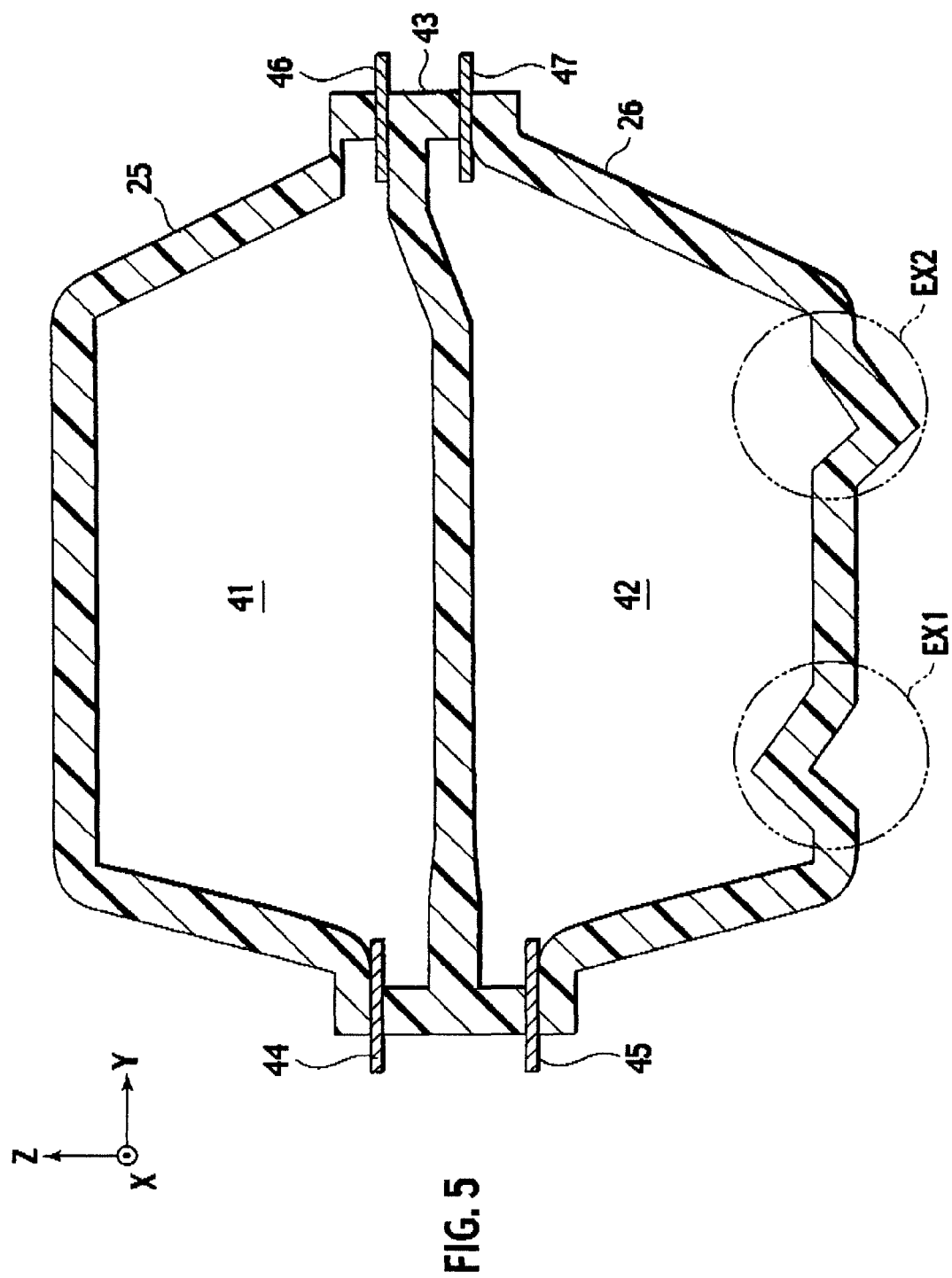
FIG. 5 is a cross-sectional view showing a lithium-ion secondary battery according to a modified example of the second embodiment.

FIG. 5 shows a modified example of the second embodiment. In a lithium-ion secondary battery shown in FIG. 5, the extra margins EX1 and EX2 are formed on part of the second package member of the second embodiment. By forming the extra margins on the second package member having the smallest linear expansion coefficient, in the case of the rise in temperature of the battery, the extra margins extend before the first package member and the third member start to deform into the convex shape up to a predetermined temperature. During this period, the first package member and the third member are not deformed into the convex shape but just expand freely. Accordingly, neither the volume inside the battery (the volumetric capacity of the exterior package) nor the lamination pressure to the battery elements (the surface pressure on the electrode-stacked bodies) changes. Consequently, the battery characteristic in a normal operation range is maintained. When the extra margins fully extend, the second package member then acts to block the free expansion of the first package member and the third member. Accordingly, the first package member is deformed into the convex shape toward the outside while the third member is deformed into the convex shape toward the first package member. Here, the battery elements are the same as those illustrated in FIG. 4, and the description thereof will be omitted herein. The extra margins similar to those described in the example of FIG. 3 may be provided herein.

A third embodiment of the present invention provides the lithium-ion secondary battery of the second embodiment, in which the linear expansion coefficient $\alpha 1$ of the first package member, the linear expansion coefficient $\alpha 2$ of the second package member, and the linear expansion coefficient $\alpha 3$ of the third member satisfy a relation of $\alpha 1 \geq \alpha 2 > \alpha 3$. Other features of the lithium-ion secondary battery of this embodiment are the same as the lithium-ion secondary battery of the second embodiment. In the third embodiment, all of the first package member, the second package member, and the third member start to expand upon the rise in temperature of the battery. Here, the linear expansion coefficients $\alpha 1$ and $\alpha 2$ of the first package member and the second package member, respectively, are greater than the linear expansion coefficient $\alpha 3$ of the third member. Accordingly, the internal stress is generated in the exterior package, and the compressive stress acts on the first package member and the second package member while the tensile stress acts on the third member. For this reason, the first package member and the second package member are deformed into convex shapes toward the outside of the battery. By this convex deformation, the volume inside the battery (the volumetric capacity of the exterior package) is increased, and the lamination pressure on the battery elements (the surface pressure on the electrode-stacked bodies) is decreased. This decrease of lamination pressure increases the internal resistance of the battery, or breaks off a conductive path. Consequently, a current flow is cut off, so that further rise in temperature is suppressed. This configuration prevents the active materials from deteriorating due to a rise in temperature, and hence, a battery in this configuration has excellent durability. Meanwhile, when the temperature of the battery returns to normal, the exterior package returns from the condition of the convex deformation toward the outside of the battery, and regains the normal contour. Accordingly, the output characteristic of the battery in a normal temperature range is maintained.

Meanwhile, in the third embodiment, assuming that the average thicknesses of the first package member and the second package member are d1 and d2 and the Young's moduli thereof are s1 and s2, respectively, and that the average thickness of the third member is d3 and the Young's modulus thereof is s3, it is preferable that these parameters satisfy a relation expressed by $(d1 \times s1 + d2 \times s2) < d3 \times s3$. If this relation is satisfied, when the first package member and the second package member begin to expand, the third member reacts to block expansion of the first package member and the second package member. Accordingly, the effect of the present invention of deformation of the first package member and the second package member into the convex shapes toward the outside of the battery is more significantly exerted.

Figure 6:
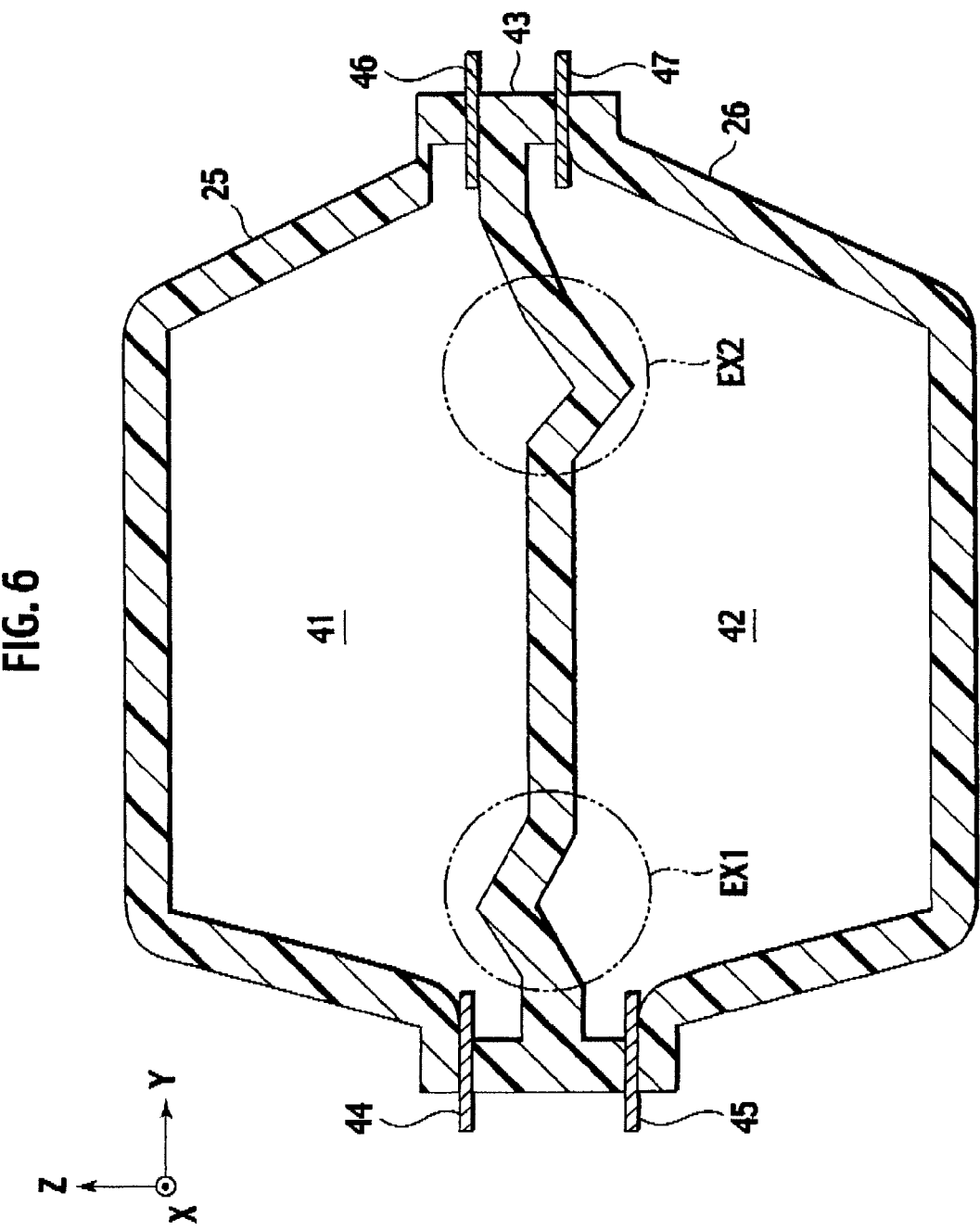
FIG. 6 is a cross-sectional view showing a lithium-ion secondary battery according to a modified example of a third embodiment.

FIG. 6 shows a modified example of the third embodiment. In a lithium-ion secondary battery shown in FIG. 6, the extra margins EX1 and EX2 are formed on part of the third member of the third embodiment. Here, the battery elements are the same as those illustrated in FIG. 4, and the description thereof will be omitted herein. The extra margins similar to those described in the example of FIG. 3 may be provided herein.

Figure 7:
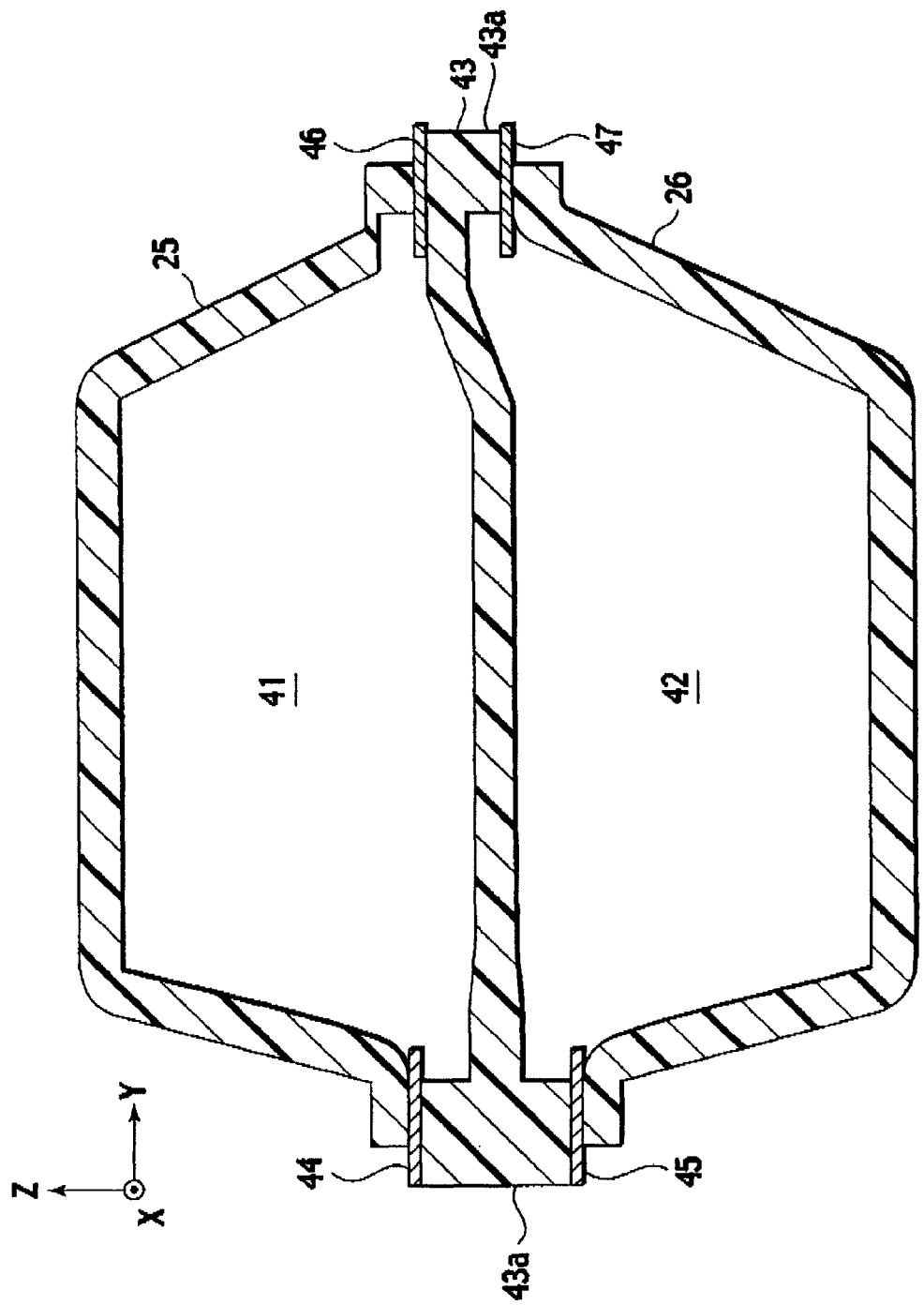
FIG. 7 is a cross-sectional view showing a lithium-ion secondary battery according to a fourth embodiment of the present invention.

A lithium-ion secondary battery according to a fourth embodiment of the present invention provides the lithium-ion secondary battery of any of the second embodiment and the third embodiment, in which the third member protrudes outwardly from the first and second package members. FIG. 7 shows a schematic cross-sectional view of the fourth embodiment. As shown in FIG. 7, the third member 43 protrudes outwardly from edges of outer peripheral portions of the first package member 25 and the second package member 26 on both ends in the Y direction of the battery, for example. Protrusions 43a of the third member effectively radiate out heat generated inside the battery. Accordingly, it is possible to improve a cooling effect of the battery, to suppress the rise in temperature inside the battery, and thereby to prevent deterioration of the battery.

Figure 8:
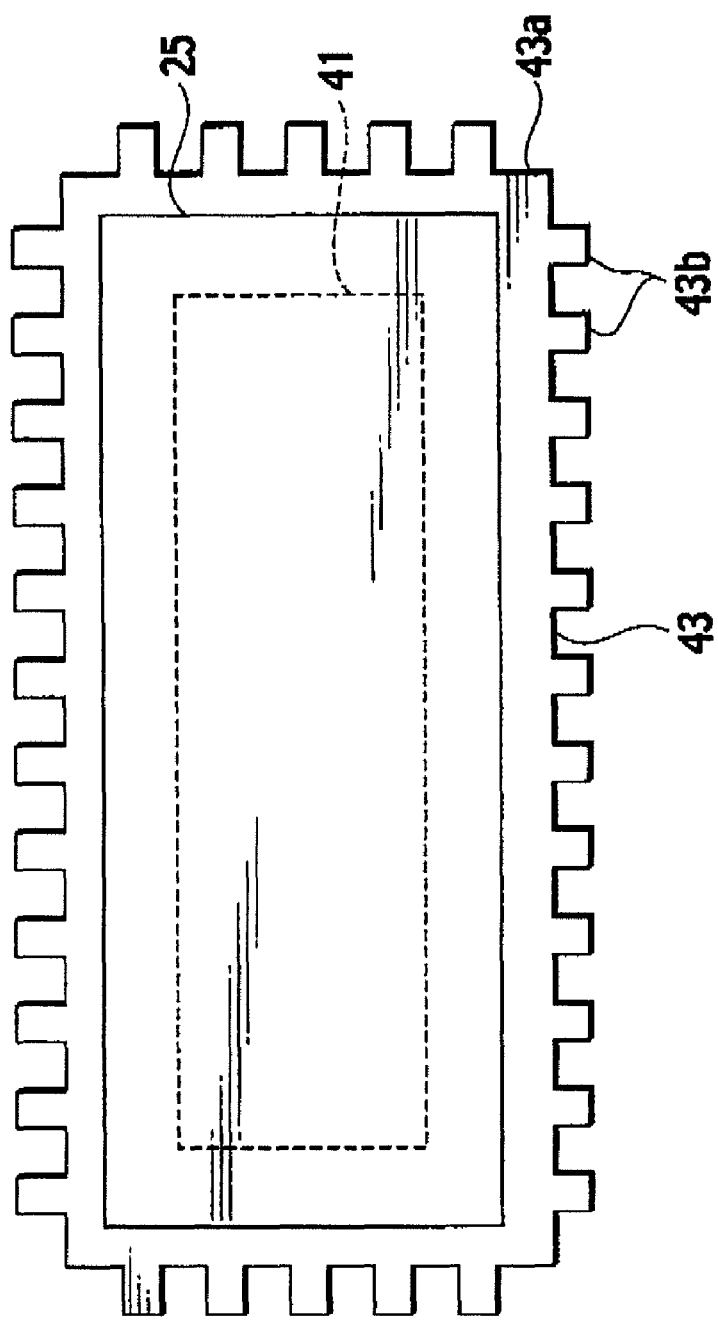
FIG. 8 is a front view showing a preferable lithium-ion secondary battery according to the fourth embodiment.

FIG. 8 is a front view showing a preferable example of the fourth embodiment which is viewed from the stacking direction of the battery. In a lithium-ion secondary battery in FIG. 8, the third member 43 is formed to have its peripheral portion protruding outwardly (in the positive and negative X directions and the positive and negative Y directions) from each of junctions of the first package member 25 and the second package member 26 (not shown). Moreover, the protrusion 43a is provided with multiple fins 43b. By providing the protrusion 43a of the third member 43 with the fins 43b, the heat generated inside the battery is efficiently removed by airflows that contact the fins. In this way, the radiation effect is improved.

Figure 9:
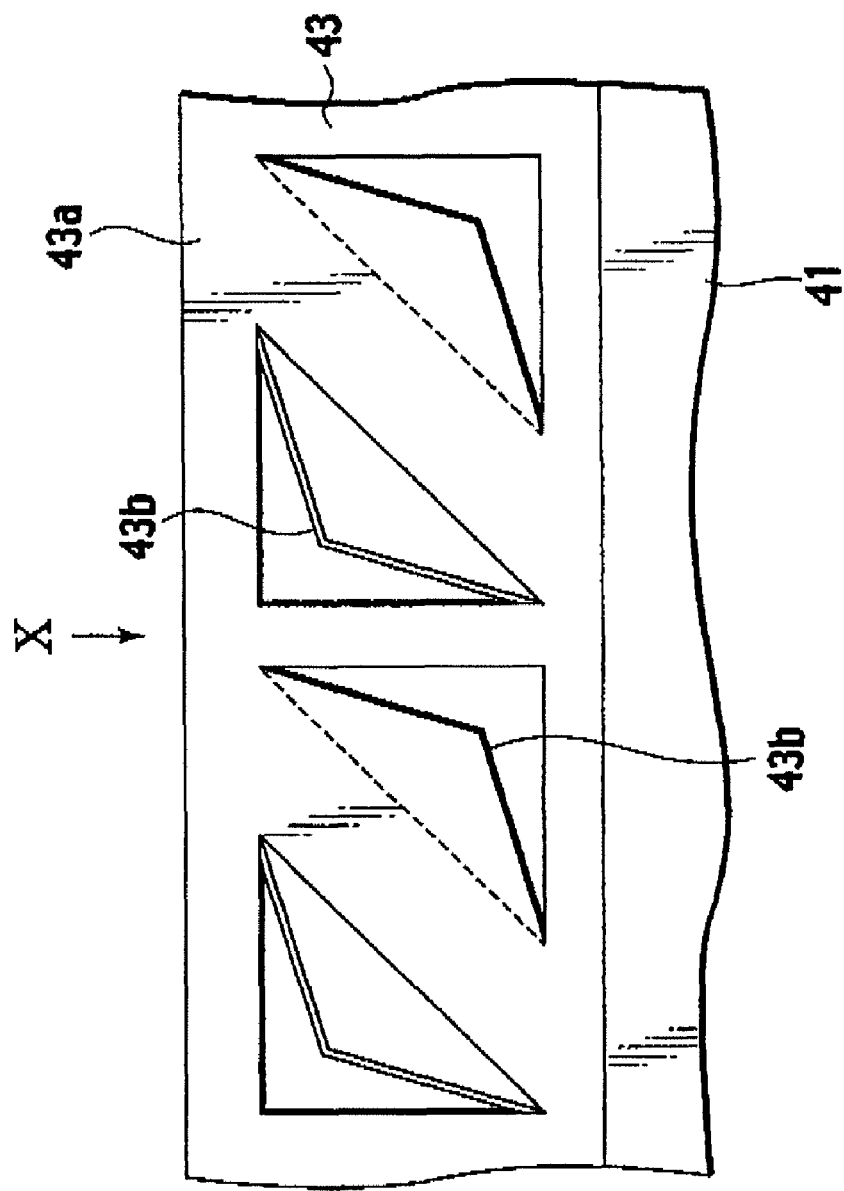
FIG. 9 is a front view showing a concrete example of shapes of fins.
Figure 10:
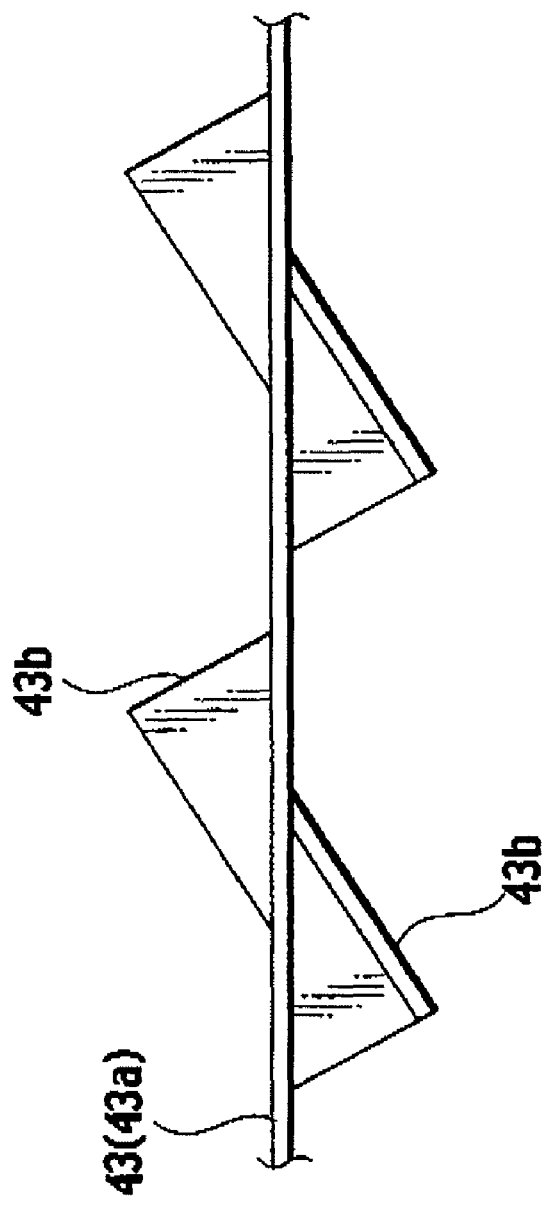
FIG. 10 is a side view showing the concrete example of the shapes of the fins.
Figure 11:
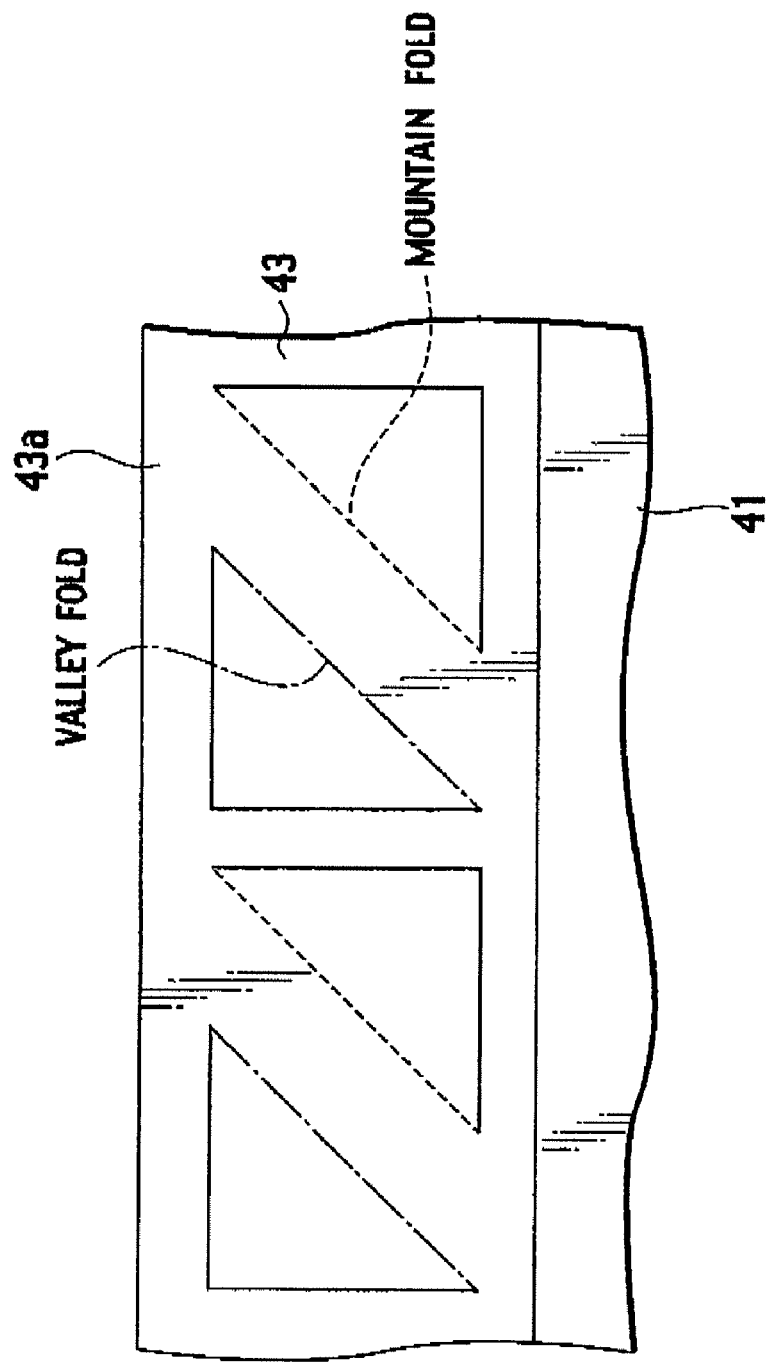
FIG. 11 is a front view showing a method of forming the fins in FIG. 9.
Figure 12:
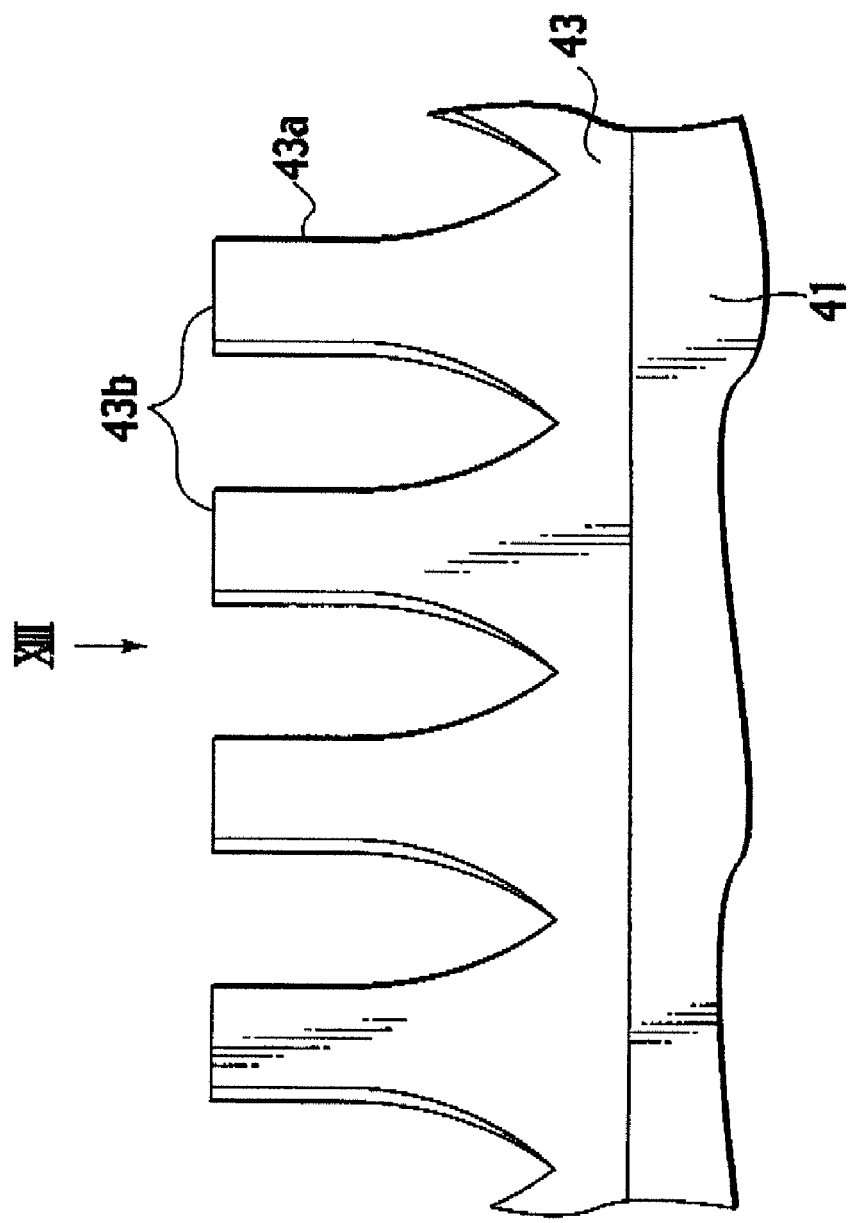
FIG. 12 is a front view showing another concrete example of shapes of fins.
Figure 14:
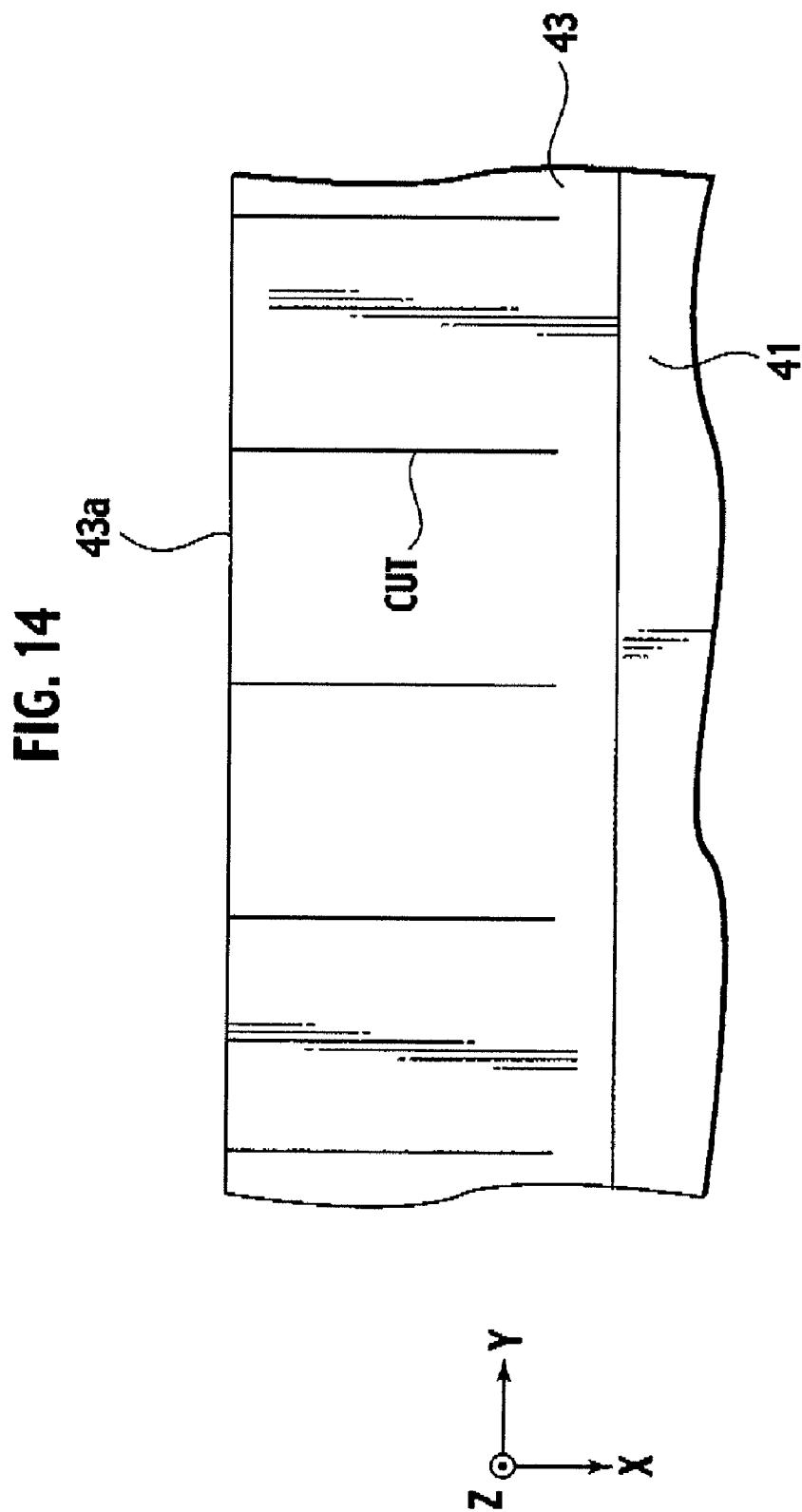
FIG. 14 is a front view showing a method of forming the fins in FIG. 12.

Shapes of the fins are not particularly limited as long as the fins can exert the radiation effect. However, a fin shape illustrated in FIG. 9 and FIG. 10 or a fin shape illustrated in FIG. 12 and FIG. 13 are considered as concrete examples. FIG. 9 is a front view partially showing the third member provided with multiple fins. FIG. 10 is a side view of the third member viewed in the direction of an arrow X in FIG. 9. As shown in FIG. 11, the fins in FIG. 9 are formed by making L-shaped cuts in the third member 43, and by alternately lifting up triangular fins from both surfaces of the protrusion 43a of the third member, specifically, by valley-folding along chain lines and by mountain-folding along dashed lines in the drawing. Meanwhile, FIG. 12 is a front view partially showing the third member provided with fins in another shape. FIG. 13 is a side view of the third member viewed in the direction of an arrow XIII in FIG. 12. As shown in FIG. 14, the fins in FIG. 12 are formed by making multiple straight cuts in the protrusion 43a of the third member 43, and by twisting the strips thus obtained respectively around axes parallel to the X direction.

In this embodiment, the radiation effect is improved by providing the protrusion 43a of the third member with the multiple fins. However, the prevent invention is not limited only to these configurations. As one of other methods to obtain the radiation effect, it is also possible to radiate the heat by connecting and fixing the third member to a heat sink.

Figure 15:
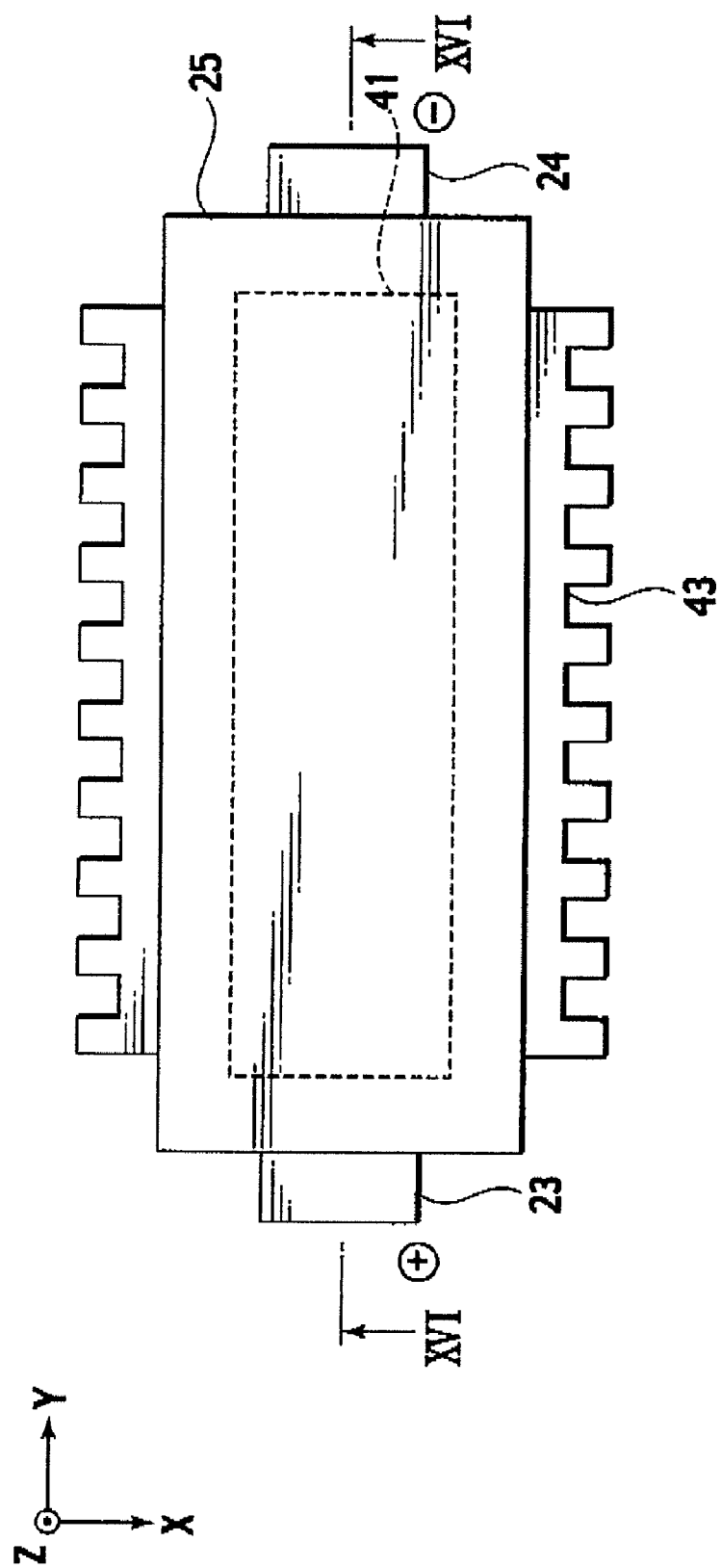
FIG. 15 is a front view showing a lithium-ion secondary battery according to a fifth embodiment.
Figure 16:
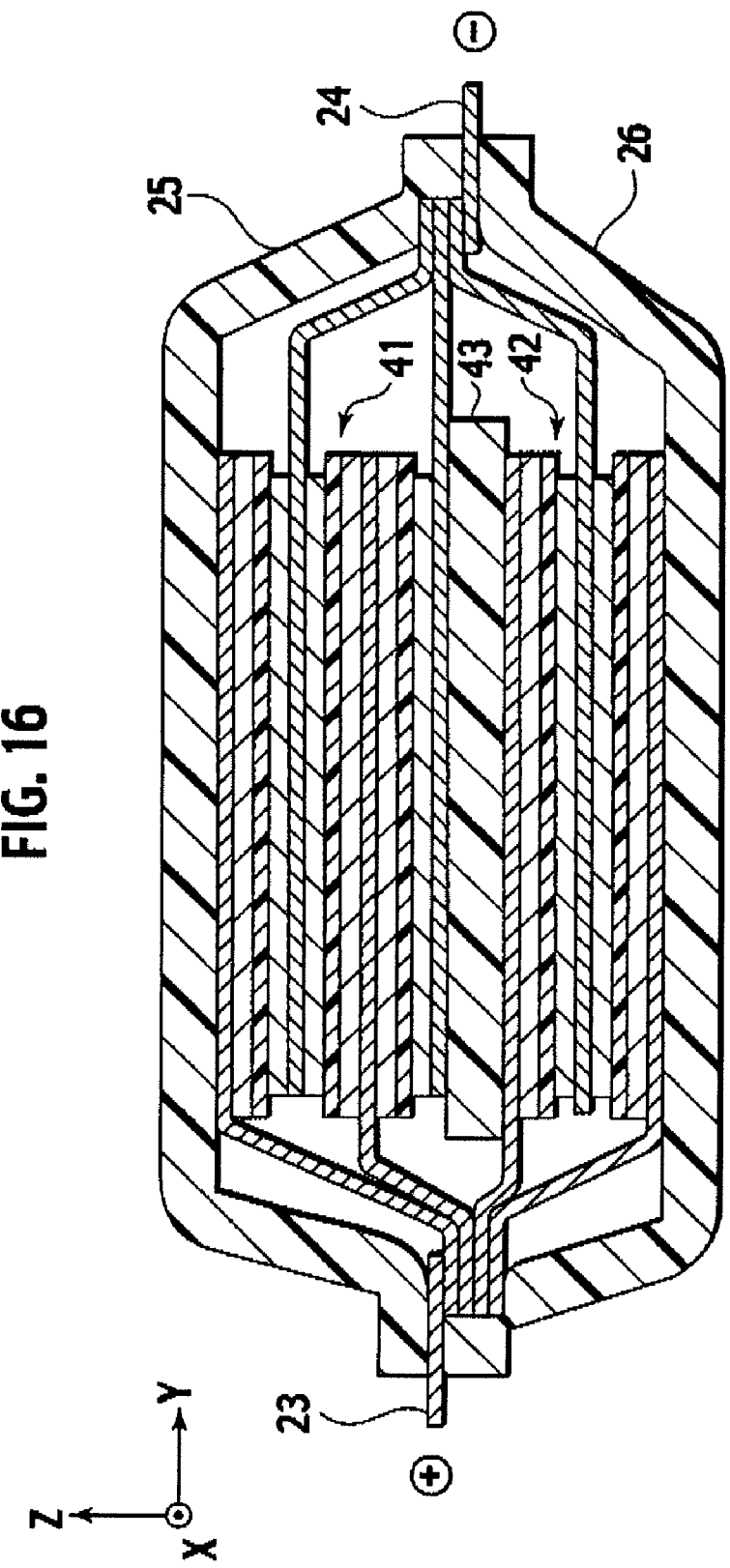
FIG. 16 is a cross-sectional view showing the lithium-ion secondary battery according to the fifth embodiment.

In the above-described embodiments, the third member is fixed and joined to the entire outer peripheral portions of both of the first and second package members. These embodiments are preferable in light of durability and the radiation effect. However, in the present invention, the third member may be partially fixed and joined to the outer peripheral portions of the first and second package members (a fifth embodiment). As shown in FIG. 15 (in a front view), in the fifth embodiment, the third member 43 is fixed and joined to the outer peripheral portions of the first and second package members on the side from which the electrode terminals 23 and 24 are not extended (both ends in the X direction in the drawing). This configuration allows provision of the third member as well as the protrusions 43a thereof without modifying the structures of the terminals. Accordingly, this embodiment is preferable in light of productivity. FIG. 16 is a cross-sectional view taken along the XVI-XVI line in FIG. 15.

In all of the embodiments described above, partial vaporization of the electrolyte inside the battery is promoted by deforming the exterior package actively into the convex shape toward the outside of the battery under a high-temperature condition. Thereby, a current shutoff effect if achieved. When the temperature of the battery rises further, heat generation of the battery is suppressed by this current shutoff effect. Later, the convex deformation of the exterior package toward the outside of the battery is reduced, and the electrolyte is liquefied again, whereby the battery returns to normal.

Meanwhile, in case of excessive heat generation inside the battery due to misusage, for example, the battery may cause an internal fracture. Accordingly, a material which can change its deformation behavior from an elastic manner to a plastic manner when an amount of the convex deformation toward the outside of the battery exceeds a certain value, may be used for the exterior package. As for such a material, the external package containing a mesh thin layer, for example, can be used. However, the present invention will not be limited only to this configuration.

A sixth embodiment provides an assembled battery formed by connecting the multiple lithium-ion secondary batteries according to any of the first to fifth embodiments in parallel and/or in series.

Connecting methods to connect the multiple nonaqueous electrolyte secondary batteries are not particularly limited, and any publicly-known methods can be used as appropriate. For example, welding methods such as ultrasonic welding or spot welding, and fixing methods using rivets or caulking can be used. Long-term reliability of the assembled battery may be improved by these connecting methods.

According to the assembled battery of this embodiment, by forming the assembled battery using the lithium-ion secondary batteries according to any of the first to fifth embodiments, the assembled battery capable of ensuring a sufficient capacity characteristic and of exerting a sufficient output under a high-output condition can be provided.

Figure 17:
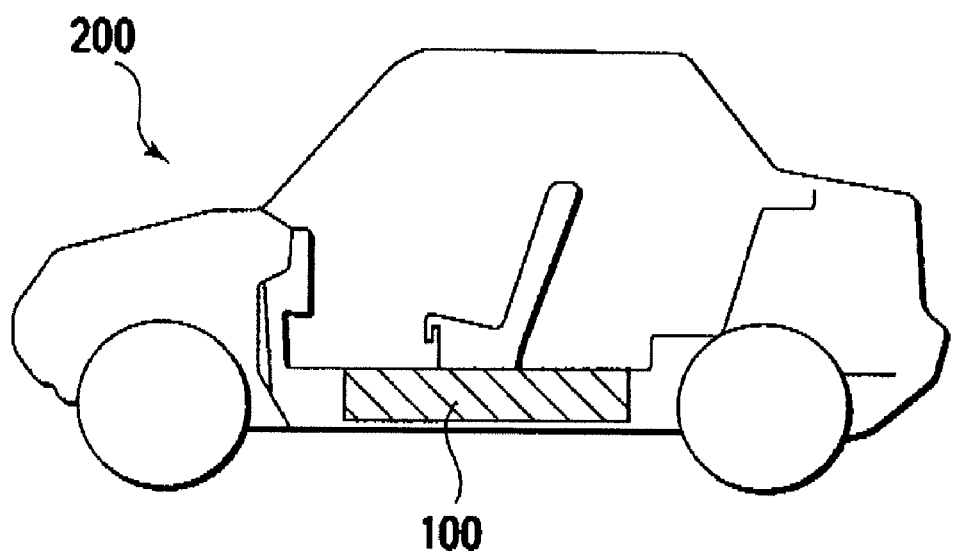
FIG. 17 is a schematic diagram showing an automobile according to a seventh embodiment which loads an assembled battery according to a sixth embodiment.

A seventh embodiment provides a vehicle by mounting any of the batteries according to the first to fifth embodiments or the assembled battery according to the sixth embodiment as a motor drive power source. Such a vehicle using the lithium-ion secondary battery or the assembled battery as the motor drive power source may be an automobile configured to drive wheels with a motor, which includes, for example, a full-electric car which does not use gasoline, a hybrid car such as a series hybrid car or a parallel hybrid car, or a fuel cell car. Since the lithium-ion secondary batteries according to the first to fifth embodiment and the assembled battery according to the sixth embodiment have excellent high-temperature durability, the battery can be arranged even in a location close to a component that frequently generates a high temperature. In this context, it is preferable to apply the lithium-ion secondary battery or the assembled battery of the present invention to such a vehicle in light of installation compatibility. FIG. 17 is a schematic diagram of an automobile 200 loading an assembled battery 100 of the present invention, which is provided for reference. The assembled battery 100 loaded on the automobile 200 has the characteristics described above. Accordingly, the automobile 200 loading the assembled battery 100 has an excellent output performance and is able to offer a sufficient output under a high-output condition.

The preferred embodiments described herein are illustrative and not restrictive, and the invention may be practiced or embodied in other ways without departing from the spirit or essential character thereof. The scope of the invention being indicated by the claims, and all variations which come within the meaning of claims are intended to be embraced herein.

The present disclosure relates to subject matters contained in Japanese Patent Application No. 2007-058287, filed on Mar. 8, 2007, the disclosures of which is expressly incorporated herein by reference in its entirety.

What is claimed is:

1. A lithium-ion secondary battery comprising:
a battery element comprising a separator, and an electrode-stacked body having a first electrode and a second electrode disposed respectively on both surfaces of the separator in a stacking direction; and
an exterior package covering the battery element, the exterior package comprising a first package member located at one side of the battery element in the stacking direction, and a second package member located at an other side of the battery element in the stacking direction, wherein the first and second package members each comprises a central portion and an outer peripheral portion disposed around the central portion and are joined to each other at the outer peripheral portions thereof,
wherein a linear expansion coefficient $\alpha 1$ of the first package member is greater than a linear expansion coefficient $\alpha 2$ of the second package member,
wherein an average thickness d1 and a Young's modulus s1 of the first package member, and an average thickness d2 and a Young's modulus s2 of the second package member satisfy a relation of $d1 \times s1 < d2 \times s2$, and
wherein the second package member comprises an extra margin that is a region of the central portion of the second package member and is bent in an inward direction or an outward direction of the secondary battery so that the extra margin extends to allow the first package member to expand freely.

2. A lithium-ion secondary battery comprising:
a first battery element and a second battery element, each of which comprises a separator, and an electrode-stacked body having a first electrode and a second electrode disposed respectively on both surfaces of the separator;
a third member sandwiched between the first and second battery elements;
a first package member covering the first battery element at an opposite side from a side where the first battery element is in contact with the third member; and
a second package member covering the second battery element at an opposite side from a side where the second battery element is in contact with the third member,
wherein:
the third member is joined at least partially at an outer peripheral portion thereof to both of the first and second package members,
a linear expansion coefficient $\alpha 1$ of the first package member, a linear expansion coefficient $\alpha 2$ of the second package member, and a linear expansion coefficient $\alpha 3$ of the third member satisfy a relation of $\alpha 1 \geq \alpha 3 > \alpha 2$, and
an average thickness d1 and a Young's modulus s1 of the first package member, an average thickness d2 and a Young's modulus s2 of the second package member, and an average thickness d3 and a Young's modulus s3 of the third member satisfy a relation of $(d1 \times s1 + d3 \times s3) < d2 \times s2$.

3. The lithium-ion secondary battery according to claim 2, wherein the second package member comprises an extra margin.

4. A lithium-ion secondary battery comprising:
a first battery element and a second battery element, each of which comprises a separator, and an electrode-stacked body having a first electrode and a second electrode disposed respectively on both surfaces of the separator;
a third member sandwiched between the first and second battery elements;
a first package member covering the first battery element at an opposite side from a side where the first battery element is in contact with the third member; and
a second package member covering the second battery element at an opposite side from a side where the second battery element is in contact with the third member,
wherein the third member is joined at least partially at an outer peripheral portion thereof to both of the first and second package members, and
wherein a linear expansion coefficient $\alpha 1$ of the first package member, a linear expansion coefficient $\alpha 2$ of the second package member, and a linear expansion coefficient $\alpha 3$ of the third member satisfy a relation of $\alpha 1 \geq \alpha 2 > \alpha 3$.

5. The lithium-ion secondary battery according to claim 4, wherein an average thickness d1 and a Young's modulus s1 of the first package member, an average thickness d2 and a Young's modulus s2 of the second package member, and an average thickness d3 and a Young's modulus s3 of the third member satisfy a relation of $(d1 \times s1 + d2 \times s2) < d3 \times s3$.

6. The lithium-ion secondary battery according to claim 5, wherein the third member comprises an extra margin.

7. The lithium-ion secondary battery according to claim 2, wherein the third member protrudes outwardly from the first package member and the second package member.

8. The lithium-ion secondary battery according to claim 7, wherein the third member comprises a fin.

9. The lithium-ion secondary battery according to claim 4, wherein the third member protrudes outwardly from the first package member and the second package member.

10. The lithium-ion secondary battery according to claim 9, wherein the third member comprises a fin.

11. The lithium-ion secondary battery according to claim 1, wherein the extra margin of the second package member is bent in the inward direction or the outward direction in a direction of the stacking direction.

* * * * *